SCAN REGISTER SINGLE GUN CONTROL SYSTEMS

Filed Jan. 18, 1956 2 Sheets-Sheet 1

INVENTORS
JOHN A. BUCKBEE
VAHAN V. TERZIAN
BY Elmer J. Gorn
ATTORNEY

INVENTORS
JOHN A. BUCKBEE
VAHAN V. TERZIAN
BY Elmer J. Gorn
ATTORNEY

United States Patent Office 2,871,403
Patented Jan. 27, 1959

2,871,403

SCAN REGISTER SINGLE GUN CONTROL SYSTEMS

John A. Buckbee, Wellesley, and Vahan V. Terzian, Watertown, Mass., assignors to Raytheon Manufacturing Company, Waltham, Mass., a corporation of Delaware Application January 18, 1956, Serial No. 559,939

7 Claims. (Cl. 315—21)

This invention relates to scan register control of single gun cathode ray tubes, particularly those used for presenting a television picture in color.

One type of cathode ray tube used for presenting television pictures in color has a single gun and a phosphorescent screen on the inside of the face plate formed with vertical stripes of phosphor. These phosphor stripes are arranged in groups with each element of the group capable of emitting light of a different primary color when impinged upon by an electron beam. The groups of stripes are separated by a blank space for a purpose to be explained hereinafter.

As the electron beam scans across the phosphor stripes at a substantially constant rate determined by the parameters of the horizontal deflection circuit, the various phosphor stripes fluoresce respectively in a color sequence, such as red, green, and blue, or in any other sequence desired, depending upon the order of the arrangement of the phosphor elements of each group or triplet.

A plurality of color video signals is derived from the color television receiver, each one representative of the primary component colors of the scene being televised. For example, in the usual tricolor system these primaries are red, green, and blue. The number of separate color video signals corresponds to the number of phosphor elements in a group, and the information conveyed by each of the video signals corresponds to the color of light emitted by a corresponding phosphor stripe in each group. The relative amplitudes of these color video signals are a function of the light intensity of the respective component colors present in the televised scene. How these signals may be derived from the incoming television signal is described in an article entitled "Compatible Color Picture Presentation With The Single Gun Tricolor Chromatron" by J. D. Gow and R. Dorr in the Proceedings of the I. R. E., vol. 42, page 308, with particular reference to Figs. 4 and 5 on page 311.

In this system, each color video signal is applied sequentially to the intensity control grid of the kinescope, while the electron beam is moving past the phosphor stripe corresponding to that color. For example, the red video signal should be applied to the electron gun only while the electron beam is traversing the red-light-emitting phosphor stripe on the fluorescent screen. In order to recurrently supply the separate color video signals one at a time and in a predetermined sequence to the intensity grid, a color coding device is used. The color coder is continuously supplied with the three separate color video signals and is adapted to permit the passage therethrough of but one color signal at a time so that all three video signals are supplied to the kinescope grid sequentially during an interval of time substantially equal to that taken for the electron beam to traverse each color triplet.

In actual practice, the electron beam position during the presence of video information corresponding to a given color will not remain in exact registration with the appropriate phosphor stripe of the fluorescent screen because of such factors as irregularities in either the beam scanning rate or in the disposition of the color triplets on the fluorescent screen, or both.

In order to achieve the required coordination between the position of the electron beam on the fluorescent screen and the receipt of corresponding color video information, means have been provided for producing signals representative of the instantaneous position of the electron beam on the fluorescent screen as the beam is scanned across the phosphor stripes of the screen. These signals, which hereinafter will be referred to as "scan register signals," are fed to the color coder.

This color coder, which essentially is a gating circuit, in response to the receipt of each incoming scan register signal, gates the various color video signals to the intensity control grid of the electron gun.

The means for producing the scan register signals includes an electron beam-intercepting electrode, hereinafter referred to as the "scan register grid," which comprises a multiplicity of spaced, electrically-interconnected elements, referred to hereinafter as "signal elements," which are spaced from the fluorescent screen which is covered with a clear conductive coating. The scan register grid is biased negative with respect to the coating on the fluorescent screen. These signal elements may be in the form of wires, or strips, which are aligned parallel to and in register with blank spaces left between the groups of phosphor stripes in said fluoroescent screen. The signal elements emit secondary electrons when impinged upon by a scanned electron beam. These electrons are collected by the conductive coating to produce pulses of current which flow through an output circuit during the traversal of said beam past these elements to provide the scan register signals. As these secondary electrons strike a blank space on the fluorescent screen, no light is emitted. By spacing the signal elements of the scan register grid from the fluorescent screen coating and by maintaining the scan register grid sufficiently negative relative to the fluorescent screen coating, all signals except those produced when the beam impinges upon the various signal elements are suppressed. The scan register signals thus are effectively separated from the video signals, thereby avoiding the use of electrical circuitry for separating the scan register signals from the video information prior to the application of the scan register signals to the color coder.

The presence of the blank stripes prevents illumination of the screen in these regions that would give spurious images. As the video signal may be such as to cut off the beam in certain areas or reduce it below the level necessary to produce a scan register signal, provision is made in the coder for the application of a fixed bias to the grid of the electron gun, which bias is independent of the presence or amplitude of the color signal or signals. The programming sequence for the color coding is such that, when the coder is triggered by a scan register signal, it will gate on successively red, green, and blue signals and then will set the beam at the reference level. The time intervals are arranged so that the color gating occurs when the beam is traversing the received color stripes, and the reference voltage is applied to the intensity control grid while the beam is passing across the blank stripe. With this arrangement, the scan register signals will be of substantially constant amplitude and will cause the color coder to function independently of the presence or amplitude of the color signal, while the presence of the blank stripe will prevent the bias level beam current from producing undesired illumination of the fluorescent screen during the interval in which only a scan register signal is derived.

Although the presence of the blank stripe will lower the allowable duty cycle of the fluorescent stripes and will cause these stripes to be narrower than otherwise, at least part of the area occupied by the blank stripes would have been shadowed by the scan register grid elements, in any event. Other methods of obtaining such a scan register signal may be used, such as those described in the copending application for United States patent, Serial No. 432,147, filed May 25, 1954, by Rudolf C. Hergenrother.

It will be seen that the accuracy of registry, even with such a system, is dependent upon the horizontal sweep and the equal spacing of the grid wires. The actual scanning register signal will vary about a central frequency:

$$f_r=\frac{W_n}{h_a}$$

where $W_n$ is the number of grid wires in a representative case 450, and $h_a$ is the active portion of the horizontal scan, 52.4 $\mu s$ according to FCC standards, with maximum variations of a .6 $\mu s$ either way. Thus the central frequency of the scanning register signal will be:

$$f_r=\frac{450}{52.4}=8.62 \text{ mc.}$$

The actual incremental displacement of the beam $\Delta d$ can vary from the normal displacement $d_0$ by as much as 10 percent, having a proportional effect upon the scan register signal frequency to give a frequency shift of 862 kc. Another variation in frequency of 6 percent can be expected as a result of variations in the grid wire spacing for a total maximum variation of 16 percent either way, or a frequency shift of 1.379 mc. If it were possible to obtain accurate scanning linearity, constant width, uniform spacing of grid wires, constant scan time, etc., then it would be possible to switch colors at a fixed frequency and obtain accurate registration. Since this is practically impossible, some form of feedback is necessary to reposition the beam to its proper position.

By the present invention, such a correcting signal is obtained by comparing the scanning register signal in phase with a reference frequency. The resulting error signal is applied to an auxiliary horizontal scanning means, either electromagnetic or electrostatic, in such phase as to reposition the beam to correct for the errors introduced by the nonlinearity of the horizontal sweep and the unequal spacing of the grid wires.

Other and further objects and advantages of this invention will be apparent as the description thereof progresses, reference being had to the accompanying drawings in which.

Figures 1, 2, 3:
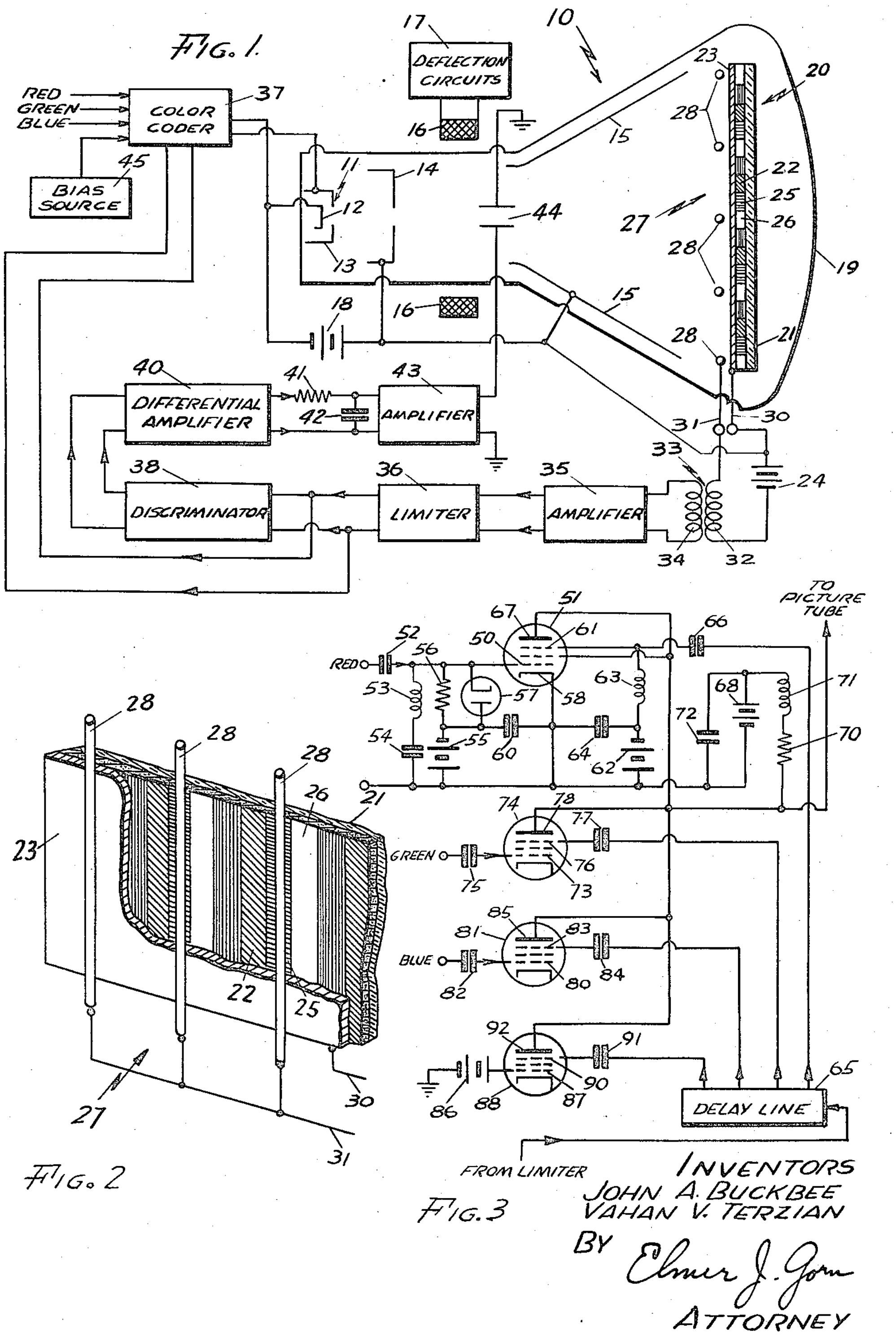
Fig. 1 is a schematic diagram of the embodiment of the invention.
Fig. 2 is a detail of a portion of the fluorescent screen and the associated grid wires.
Fig. 3 is a schematic diagram of a coding circuit suitable for use with the invention.

In Fig. 1, the reference numeral 10 designates generally a cathode ray tube, which includes an electron gun 11 comprising a cathode 12 and intensity control grid 13, a focussing and accelerating anode 14, and a second accelerating anode 15, which may consist of an electrically-conductive coating on the inner wall of the tube envelope connected to a source 18 of high positive potential. The tube 10 is equipped with horizontal and vertical deflection coils 16 that receive sweep currents from appropriate horizontal and vertical deflection circuits 17.

Mounted near the viewing face 19 of the tube 10 is a target electrode 20, which includes a rigid supporting member 21, which may be made of glass, mica, or any other material capable of transmitting light, a fluorescent screen 22, and an electrically-conductive electron permeable layer or coating 23 on said fluorescent screen. The fluorescent screen may be deposited directly upon the viewing face of the tube, in which case the supporting member 21 may be omitted. The thickness of the layers 22 and 23 of the target electrode 20 are greatly exaggerated in the drawings in the interest of clarity of illustration.

The coating 23 is preferably made of aluminum, which may be applied by a process of evaporation in a vacuum and serves as an electrode to which one terminal of a high voltage source 24 is connected. The anode 15 and coating 23 are maintained at the same high potential in respect to the cathode of the tube in order to prevent the flow of secondary electrons from the fluorescent screen coating to the anode.

Fluorescent screen 22 consists of a plurality of groups, or triplets, of vertically disposed stripes, or areas 25, capable of emitting red, green, and blue light, respectively, as indicated by the different cross-hatchings, whenever an electron beam impinges thereupon. The groups of phosphor stripes are repetitively arranged over the target areas with the stripes preferably normal to the direction of line scanning in order to obtain the maximum resolving power. There are 450 such groups of stripes in a representative tube. The electron beam may be permitted to scan the phosphor stripes at an angle somewhat shifted from 90 degrees, provided that reduced resolving power may be tolerated. Since line scanning is horizontal in television systems now in general use, the phosphor stripes are preferably arranged vertically.

Spaced on either side of each group, or triplet, of the fluorescent screen are elongated blank stripes or areas 26. These areas are either uncoated or contain a deposited material which does not fluoresce to produce light in the visible spectrum under the conditions of operation of the tube. These blank regions bounding the color triplets will be referred to in the specification and claims either as blank stripes or blank areas.

Although the groups of color stripes so far described have been groups of three, comprising the colors red, green, and blue, it should be understood that this invention is not so limited. The number of phosphor stripes and their color emission will depend upon the number of primary component colors selected for the television system being considered; or the phosphor selected may represent one of two or more types of information to be presented in a dot sequential manner.

A scan register grid 27 is spaced from the fluorescent screen and comprises a plurality of spaced signal elements 28 which are electrically interconnected. The signal elements 28 may be in the form of wires stretched on an insulated metal frame which is connected to the external circuit through a separate terminal. The signal elements or grid wires are arranged parallel to, and in alignment with, and preferably in a plane spaced ¼ to ½ of an inch from, the blank stripes 26 of the fluorescent screen. Lead 30 connected to the fluorescent screen 23 and lead 31 connected to the scan register grid 27 provide for connection to the external circuitry. The above-described construction is best seen in Fig. 2. Other forms of scan register grids, such as those shown in the above-cited application of Hergenrother, may be used.

The scan register grid 27 is biased negative relative to the fluorescent screen coating 22 by means of the unidirectional voltage source 24, which is connected in series with the primary 32 of a transformer 33 across electrodes 23 and 27. If the scan register grid 27 is biased negatively relative to the aluminum coating 23, as shown, the scan register grid will not intercept secondary electrons emitted from the aluminum coating, but the aluminum coating will receive secondary electrons emitted from the signal elements 28 of the grid 27 as the beam sweeps across said elements. Thus, a scan register signal is obtained which is free of signal components due to electrons striking the phosphor stripes. It has been found that a bias voltage of the order of 50 to 100 volts is generally sufficient for this purpose.

The secondary emission current, above described, circulates in the primary 32 of transformer 33, and a scan register output signal in the form of a pulse is derived across the terminals of the secondary winding 34 of the transformer 33 each time the electron beam impinges upon a signal element 28. This scan register signal is supplied to an amplifier 35, the output of which is limited in limiter 36, and applied to a color coder 37, where it initiates a gating sequence by which the red, green, and blue video signals and a bias are successively applied between the grid and cathode of the picture tube. Due to the limiting action, the scan register signal is freed of any video amplitude modulation that might be present when the beam strikes a grid while the control grid is still modulated by a video signal. This scan register signal is also applied to a discriminator 38, the output of which is amplified in a differential amplifier 40, after which it is integrated by a circuit comprising a series resistor 41 and a shunt capacitor 42 and, after further amplification in amplifier 43, is applied to an auxiliary deflection means shown in this figure as a set of deflection plates 44.

The color coder 37 is an electrical commutating device actuated by the scan register signal and having input terminals to which the various color video signals and a reference bias signal from a source 45 are applied. For example, coder 37 may consist of a plurality of gate circuits associated either with counter circuits or delay lines and sequentially energized in response to an incoming scan register signal. Upon the arrival of each scan register signal at the input of the color coder 37, the red video signal is first supplied to the intensity grid 14 of the tube. A time delay in the coding or sampling process may be introduced between the initial receipt of the scan register signal and the application of the red video signal to the grid of the tube corresponding to the time taken for the beam to reach the leading edge of the red phosphor stripe. The expression "leading edge" refers to the edge of a given stripe first traversed by the scanning beam, and the expression "trailing edge" corresponds to the last portion of the stripe to be scanned. During a period of time equal to that required for the beam to traverse the green phosphor stripe, the coder will be conditioned to pass the green video signal, following which the coder will pass the blue video signal while the beam is traversing the blue phosphor stripe. During the remainder of the coding period, during which the beam is scanning the blank stripe, the coder will pass a fixed level bias signal from the bias source 45, which may be a battery or other generator of constant amplitude unidirectional voltage.

A circuit for accomplishing this coding action is shown in Fig. 3. The red video signal is applied to the grid 50 of a multigrid tube 51 through a capacitor 52 across an inductance 53 and a capacitor 54 arranged in series. A negative bias from a source 55 is applied to the grid 50 through a resistor 56 shunted by a diode 57. The source 55 is bypassed to the cathode 58 by a capacitor 60. The suppressor grid 61 is connected to a source 62 of negative potential through an inductance 63. The source 62 is bypassed by a capacitor 64. The suppressor grid 61 is also coupled to a delay line 65, the input of which receives the scan register signal from the limiter, through a capacitor 66. The delay introduced is determined by the time required for the beam to reach the leading edge of the red phosphor stripe. The plate 67 is connected to a source 68 of positive potential through a resistor 70 and a peaking coil 71. The source 68 is bypassed by a capacitor 72. The plate 67 is also connected to the cathode of the picture tube. The green video signal is applied to the grid 73 of a second multigrid tube 74 through a capacitor 75. The suppressor grid 76 is coupled to a second tap on the delay line 65 through a capacitor 77. The section of the delay line between the first and second taps introduces a delay corresponding to the additional time required for the beam to reach the green phosphor stripe. The plate 78 is connected to the cathode of the picture tube. The rest of the circuitry associated with tube 74 has been omitted for the sake of simplicity but it is to be understood to be the same as that shown for tube 51. Similarly, the blue video signal is applied to the grid 80 of the third multigrid tube 81 through a capacitor 82. The suppressor grid 83 is coupled to a third tap on the delay line 65 through capacitor 84. The delay introduced by the section of the delay line between the second and third taps is determined by the additional time required to reach the blue phosphor stripe. The plate 85 is also connected to the picture tube cathode. The remainder of the circuitry associated with tube 81 is the same as that shown in connection with tube 51. A source 86 of positive potential is connected to the control grid 87 of a fourth multigrid tube 88. The suppressor grid 90 is coupled to a fourth tap on the delay line 65 through a capacitor 91. The delay introduced by the portion of the delay line between the third and fourth taps is determined by the additional time required for the beam to reach the blank stripe. The plate 92 is also connected to the cathode of the picture tube, so that the grid of the picture tube is made to have a fixed positive potential with respect to its cathode, and a predetermined beam current strikes the grid wire 28 being scanned during that time to produce a predetermined scan register signal.

The order of the coding just referred to is illustrative only, and any arrangement of the phosphor stripes consistent with the received signal is possible, provided that the programming sequence in the color coder is made to correspond.

Figure 4:
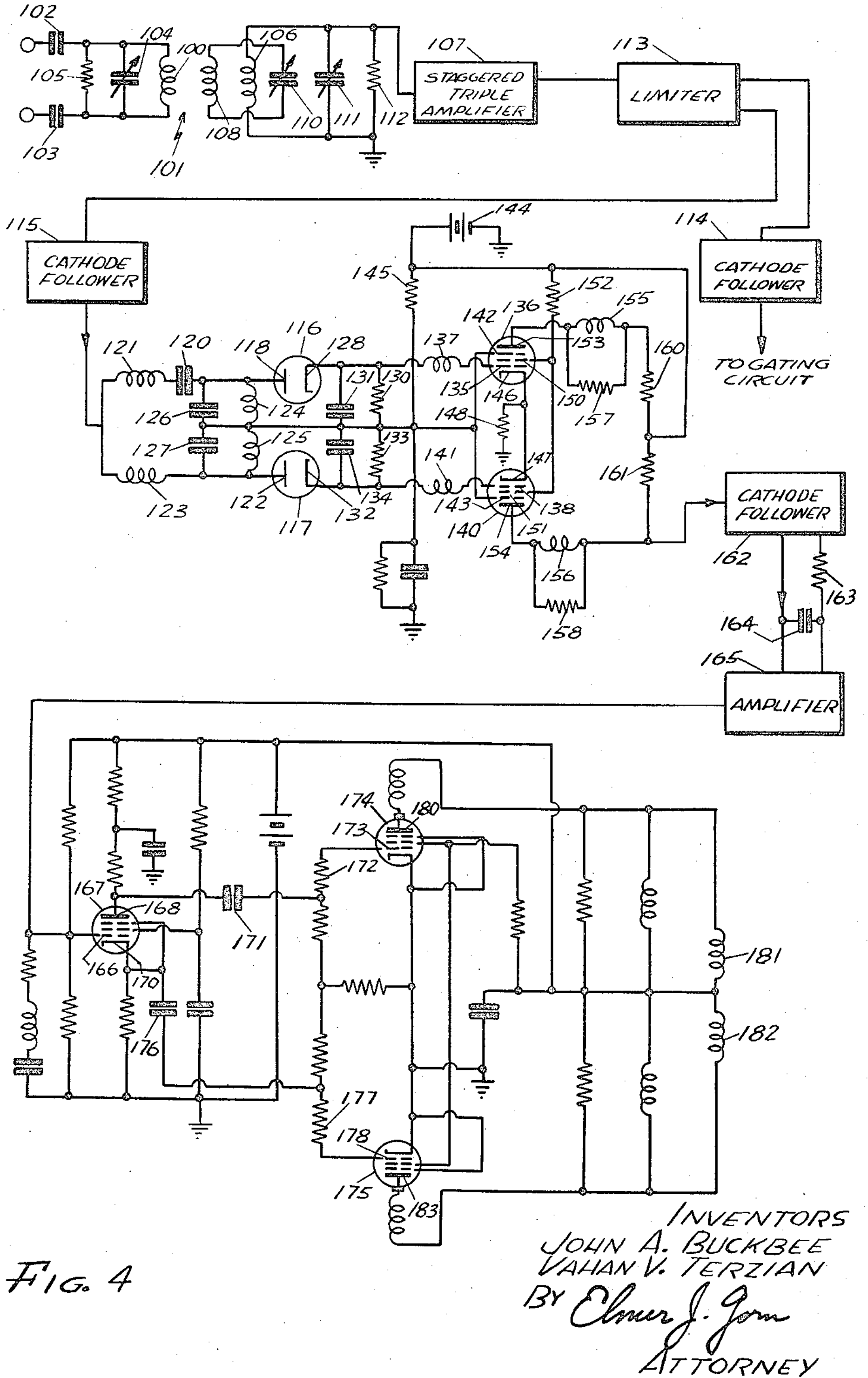
Fig. 4 is a somewhat more detailed schematic diagram of the circuit portion of a modified embodiment of the invention.

The circuit for deriving the scanning register signal and the auxiliary deflection energy is shown in greater detail and somewhat modified in Fig. 4. The scanning register signal developed between the grid 27 and screen 23 is applied to the primary 100 of a transformer 101 through blocking capacitors 102 and 103. The shunting effect of the capacity between the grids 28 and the conductive layer 23 is resonated by the inductance of the primary 100 to bring up the signal voltage. Additional capacity is added by the shunt variable capacitor 104, and the band pass of the circuit is broadened by the shunt loading resistor 105. The voltage developed across the secondary 106 is applied to a triple tuned stagger amplifier 107. There is a tertiary winding 108 tuned by capacitor 110. The secondary 106 is also tuned by capacitor 111 and loaded by a shunt resistor 112 to give a triple tuned circuit. The purpose of this circuit is to increase the amplitude of the scan register signal and to assure the passage of a wide enough band of frequencies about the central frequency of this signal to accommodate the maximum range of error to be expected. The output of the amplifier 107 is limited in limiter 113 and applied through cathode follower 114 to the gating or color coder circuits, such as those shown in Fig. 3. The output of the limiter is also applied through a cathode follower 115 to a frequency discriminator comprising a pair of diodes 116 and 117. The anode 118 of diode 116 is coupled to the input through a capacitor 120 and an inductance 121 connected in series. The anode 122 of the diode 117 is connected to the input through an inductance 123. The anodes 118 and 122 are connected together through inductances 124 and 125, each shunted by a capacitor 126 or 127, respectively. The cathode 128 of the diode 116 is connected to the junction of inductances 124 and 125 through a resistor 130 shunted by a capacitor 131. The cathode 132 of the diode 117 is connected to the junction of inductances 124 and 125 through a resistor 133 shunted by a capacitor 134.

This discriminator circuit, including the diodes 116 and 117, is of the type known as a Weiss discriminator, which is described in "Microwave Mixers" by Robert V. Pound, vol. 16, of the Radiation Laboratory Series in Section 7.7 beginning on page 302. This type of discriminator is essentially the capacitance-coupled analogue of the better known Foster-Seeley discriminator circuit. It has the advantage of reducing the detrimental effect of stray capacitances by making them serve a useful purpose. The entire circuit is resonant at the central frequency, and the branch associated with diode 116 is resonant at a higher frequency than the central frequency of the branch associated with diode 117, which is resonant at a lower frequency than the central frequency. There is no output when the applied signal is at the central frequency and a positive output when the input signal deviates above the central frequency and a negative output when the signal deviates below this frequency.

The output of the discriminator is coupled to a differential amplifier. The cathode 128 of diode 116 is connected to the grid 135 of a pentode 136 in this amplifier through an inductance 137. The cathode 132 of a diode 117 is connected to the grid 138 of a pentode 140 through an inductance 141. The junction of resistors 130 and 133 is connected to the suppressor grids 142 and 143 of the pentodes 136 and 140, respectively, and to a source 144 of positive potential through a resistor 145. The suppressor grids 142 and 143 are connected to the junction of resistors 130 and 133. The screen grids 150 and 151 are connected to the source 144 of positive potential through a resistor 152. The anodes 153 and 154 are connected together through inductances 155 and 156, each shunted by a resistor 157 or 158, respectively, and a resistor 160 or 161, respectively. The junction of resistors 160 and 161 is connected to a source 144 of positive potential. The junction between the resistors 161 and 158 is connected to the input of a cathode follower 162. The output of the cathode follower 162 is applied to an amplifier 165 through resistor 163 shunted by a capacitor 164. The resistor 163 and the capacitor 164 form an integrating circuit similar to that formed by resistor 41 and capacitor 42 in Fig. 1. The output of amplifier 165 is applied to the grid 166 of a pentode 167 connected in a phase splitter circuit with the output in one phase taken from the anode 168, and that in the opposite phase from the cathode 170. The anode 168 is coupled through a capacitor 171 and resistor 172 to the grid 173 of one of a pair of pentodes 174 and 175 connected as a push-pull amplifier. The cathode 170 of tube 167 is coupled through capacitor 176 and resistor 177 to the grid 178 of pentode 175. The anode 180 of pentode 174 is connected to one end of one of a pair of auxiliary deflection coils 181, the other of which, 182, is connected to the anode 183 of the pentode 175. The current flowing through the auxiliary deflection coils 181 and 182 must be in phase opposition to the current flowing through the main deflection coils, so that the correction effect can be obtained without the intermodulation of the tube deflecting signals due to magnetic coupling between the coils. If the electrostatic plates of Fig. 1 are used for this auxiliary deflection, this problem is not present. The inductance and stray capacitance of the auxiliary deflection coils 181 and 182 limit the speed at which corrections can be made. The additional resistances shown shunting the auxiliary deflection coils serve to partially compensate for this effect. However, it has been found that if the correction action takes place within four or five triplets, the eye will not notice the error in register on a color picture tube of the type described, 14½ inches wide viewed at the normal distance. By the use of the scan register correction circuit of this invention, the residual error in scan register is substantially reduced.

This invention is not limited to the particular details of construction, materials, and processes described, as many equivalents will suggest themselves to those skilled in the art. It is accordingly desired that the appended claims be given a broad interpretation commensurate with the scope of the invention within the art.

What is claimed is:

1. In a color television receiver, a cathode ray tube adapted to receive video information corresponding to the presence of primary component colors in a televised scene including means for producing an electron beam comprising a cathode, a grid and an accelerating electrode, a fluorescent screen composed of a plurality of recurrent groups of elongated phosphor areas extending along said screen in a given direction and a plurality of blank areas positioned between ones of said groups, each of said phosphor areas of a given group being productive of light of a different primary color when said electron beam impinges upon it, a beam-intercepting grid positioned adjacent said fluorescent screen and including a series of spaced signal elements arranged parallel to and in alignment with corresponding blank areas, principal deflection means for scanning said beam across said fluorescent screen in a direction substantially normal to said given direction of said phosphor areas, means responsive only to the interception of said electron beam by said signal elements for producing scan register control signals independently of the presence of said video information, amplifying and limiting means responsive only to said scan register signals, discriminator means to compare the frequency characteristic of said scan register signals with the frequency characteristic of a reference signal, amplifying and integrating means responsive to the frequency difference of said scan register signals and said reference signal to obtain a control signal, and auxiliary deflection means responsive to said control signal to correct continuously the position of said electron beam, to assure correct scanning register.

2. In a color television receiver, a cathode ray tube adapted to receive video information corresponding to the presence of primary component colors in a televised scene including means for producing an electron beam comprising a cathode, a grid and an accelerating electrode, a fluorescent screen composed of a plurality of recurrent groups of elongated phosphor areas extending along said screen in a given direction and a plurality of blank areas positioned between ones of said groups, each of said phosphor areas of a given group being productive of light of a different primary color when said electron beam impinges upon it, a beam-intercepting grid positioned adjacent said fluorescent screen and including a series of spaced signal elements arranged parallel to and in alignment with corresponding blank areas, principal deflection means for scanning said beam across said fluorescent screen in a direction substantially normal to said given direction of said phosphor areas, means responsive only to the interception of said electron beam by said signal elements for producing scan register control signals independently of the presence of said video information, amplifying and limiting means responsive only to said scan register signals, gating means responsive to the presence of said limited scan register signals for applying in succession both the said received signals and a constant signal to said grid of said cathode ray tube simultaneously with the traversal of said electron beam across the corresponding phosphor areas and the blank area, respectively, discriminator means to compare the frequency characteristic of said scan register signals with the frequency characteristic of a reference signal, amplifying and integrating means responsive to the frequency difference of said scan register signals and said reference signal to obtain a control signal, and auxiliary deflection means responsive to said control signal to correct continuously the position of said electron beam to assure correct scanning register.

3. In a color television receiver, a cathode ray tube adapted to receive video information corresponding to the presence of primary component colors in a televised scene including means for producing an electron beam comprising a cathode, a grid and an accelerating electrode, a fluorescent screen composed of a plurality of recurrent groups of elongated phosphor areas extending along said screen in a given direction and a plurality of blank areas positioned between ones of said groups, each of said phosphor areas of a given group being productive of light of a different primary color when said electron beam impinges upon it, a beam-intercepting grid positioned adjacent said fluorescent screen and including a series of spaced signal elements arranged parallel to and in alignment with corresponding blank areas, principal deflection means for scanning said beam across said fluorescent screen in a direction substantially normal to said given direction of said phosphor areas, means responsive only to the interception of said electron beam by said signal elements for producing scan register control signals independently of the presence of said video information comprising means for maintaining said beam-intercepting grid at a negative potential with respect to said fluorescent screen, limiting, frequency discriminating and integrating means, gating means adapted to apply signals of each primary color and a fixed potential between the grid and cathode of said cathode ray tube in succession as the beam traverses the corresponding phosphor area and the blank area, respectively, in each group, means for initiating this gating action under control of said limited but undiscriminated scan register control signal, deflection means controlled by said scan register signals to correct the position of the electron beam in response to the control signals to assure scanning register.

4. In combination, a cathode ray tube adapted to receive signals of at least two types, including means for producing an electron beam, principal deflection means for scanning said electron beam across a fluorescent screen so as to intercept conducting elements positioned between recurrent groups of phosphor areas of said screen, limiting means responsive only to said interception of said beam with said conducting elements to produce a scan register signal, discriminating means responsive both to the frequency characteristic of said scan register signal and to the frequency characteristic of a reference signal, integrating means responsive to the frequency difference of said scan register signal and said reference signal to produce a control signal, and auxiliary deflection means responsive to said control signal to correct continuously the position of said electron beam to assure correct scanning register.

5. In combination, a cathode ray tube adapted to receive signals of at least two types, including means for producing an electron beam, principal deflection means for scanning said electron beam across a fluorescent screen so as to intercept conducting elements positioned between recurrent groups of phosphor areas of said screen, limiting means responsive only to said interception of said beam with said conducting elements to produce a scan register signal, gating means responsive to the presence of said scan register signal to coordinate said received signals with the passage of said beam across the said corresponding phosphor areas of said screen, discriminating and integrating means responsive to the frequency characteristic of said scan register signal to produce a control signal, and auxiliary deflection means responsive to said control signal to correct continuously the position of said electron beam to assure correct scanning register.

6. In combination, a cathode ray tube adapted to receive signals of at least two types, including means for producing an electron beam, a fluorescent screen composed of a plurality of phosphor areas arranged to produce light of different colors when impinged by said electron beam and a plurality of blank areas positioned between said phosphor areas, principal deflection means for scanning said electron beam across said fluorescent screen, means in the form of conducting elements positioned adjacent said blank areas of said fluorescent screen to intercept said electron beam, amplifying and limiting means responsive only to said interception of said beam with said conducting elements to produce a scan register signal, discriminator means responsive to the frequency characteristic of said limited scan register signal to compare said frequency characteristic of said scan register signal with the frequency characteristic of a reference signal, amplifying and integrating means responsive to the frequency difference of said scan register signal and said reference signal to obtain a control signal, and auxiliary deflection means responsive to said control signal to correct continuously the position of said electron beam to assure correct scanning register.

7. In combination, a cathode ray tube adapted to receive signals of at least two types including means for producing an electron beam, an intensity-control grid to control said beam, a fluorescent screen composed of a plurality of phosphor areas arranged to produce light of different colors when impinged by said electron beam and a plurality of blank areas positioned between said phosphor areas, principal deflection means for scanning said electron beam across said fluorescent screen, means in the form of conducting elements positioned adjacent said blank areas of said fluorescent screen to intercept said electron beam, amplifying and limiting means responsive only to said interception of said electron beam with said conducting elements to produce a scan register signal, gating means responsive to the presence of said limited scan register signal for applying in succession both the said received signals and a constant signal to said intensity-control grid of said cathode ray tube simultaneously with the traversal of said electron beam across the corresponding phosphor areas and the blank area, respectively, discriminator means responsive to the frequency characteristic of said scan register signal for comparison with the frequency characteristic of a reference signal, amplifying and integrating means responsive to the frequency difference of said scan register signal and said reference signal to obtain a control signal, and auxiliary deflection means responsive to said control signal to correct continuously the position of said electron beam to assure correct scanning register.

References Cited in the file of this patent

UNITED STATES PATENTS

| | | |
|---|---|---|
| 2,689,269 | Bradley | Sept. 14, 1954 |
| 2,725,421 | Valdes | Nov. 29, 1955 |
| 2,743,312 | Bingley | Apr. 24, 1956 |
| 2,743,379 | Fernsler | Apr. 24, 1956 |
| 2,755,410 | Schlesinger | July 17, 1956 |